Patented Apr. 2, 1935

1,996,069

UNITED STATES PATENT OFFICE 1,996,069

PROCESS FOR THE PRODUCTION OF CONDENSATION PRODUCTS

Herbert Hönel, Vienna, Austria, assignor to Beck, Koller & Company, Detroit, Mich.

No Drawing. Original application September 9, 1927, Serial No. 218,587. Divided and this application January 2, 1931, Serial No. 506,297. In Austria August 6, 1927

25 Claims. (Cl. 260—4)

The invention relates to an improvement in condensation products and the process of making the same. The present application is a division of my application Serial Number 218,587, filed September 9, 1927, entitled Process for the production of condensation products, now Patent No. 1,800,295, dated April 14, 1931.

The claims of the present application are directed to oily or resinous condensation products obtained by condensing phenols substituted in the para-position by a hydrocarbon radicle and an aldehyde with the aid of any known catalyst. More particularly they are directed also to heat hardening condensation products prepared from such phenols and a substantial excess of formaldehyde over the equimolecular proportion with the aid of a strong alkaline catalyst, said condensation products being capable of forming uniform homogeneous products when reacted with a multiple proportion of substantially neutral resins, of drying oils or mixtures thereof.

It is known that, in general, phenols and formaldehyde when treated with alkaline contact agents, furnish condensation products which, according to the conditions employed, are either resinous or merely oily to viscous, and pass over, at higher temperatures, into the infusible and insoluble state. The employment of acid contacts furnishes, under certain conditions, fusible and soluble resins which, as is known, find application in the varnish industry.

It is remarkable that resins prepared from p-cresol and formaldehyde differ decidedly, in point of solubility, from those of equal melting point from phenol or o-cresol, and still more from those prepared from m-cresol. Solubility in alcohol is a property common to them all; but whereas the last-named resins are almost completely insoluble in benzol hydrocarbons, the first-named are completely soluble therein, and even in mixtures of the latter with benzine.

It has now been ascertained that by condensing aldehydes and phenols which are substituted in the p-position by a higher hydrocarbon radicle containing preferably from 4 to 7 carbon atoms, resinous products can be obtained which are completely soluble in benzine, and also in oils, and possess highly valuable properties. Such phenols are, in part, easily prepared owing to the special reactivity of the p-hydrogen atom in the molecule; for example by heating phenol with higher alcohols in presence of dehydration agents such as anhydrous zinc chloride, magnesium chloride or primary alkali sulphates (see, inter alia, Ber. d. deutschen Chem. Ges. vol. 14, p. 1842 et. seq., vol. 15, p. 150 et seq., vol 16, p. 792, vol. 17, p. 669, vol. 26, p. 1646 and German Patent No. 17,311). They can also be prepared from phenol by reactive haloids in presence of agents capable of splitting off halogen hydrides (see Ber. 15, p. 152; 32, p. 2428; German Patent 18,977). They can also be obtained with advantage in a circuitous manner, for example from alkylated benzol through its sulphonic acid, or from the corresponding amide, under which conditions p-substituted phenols alone are obtained in nearly all cases.

A process for the production of resins is known and is set forth in German Patent No. 340,989 in which phenols are first condensed with unsaturated hydrocarbons, by the Koenigs method (Ber. vol. 23, p. 3145; vol. 24, p. 179 and 3889 and vol. 25, p. 2649); and then with aldehydes. The first condensation produces a mixture of different materials including some p-substituted phenols. Especially in the case of iso-amylenes, the resulting mixture contains only about 6% of the corresponding p-substituted phenol, the remainder comprising uncombined starting materials, together with ester-like compounds and polymerization products of the iso-amylene. The resins obtained by the above process are also soluble only in benzol, but insoluble in benzine. On the other hand, however, according to the present process, the p-butylphenol obtained from isobutylalcohol and phenol, for example, furnishes with formaldehyde—notwithstanding the smaller aliphatic radicle—a resin which is soluble in benzine in all proportions. As a matter of course, acetaldehyde, for example, furnishes with the same substance a resin which is not less soluble in benzine. Particularly valuable materials are the purified phenols with a p-substituted tertiary radicle, since they furnish with aldehydes very pale resins which are fast to light. Moreover, in order to obtain, with aldehydes, resins of high melting point and satisfactorily soluble in benzine, it is not unconditionally necessary to purify the phenols, prepared in the specified manner, from various by-products, such as those of ethereal character. The originating materials may also consist of phenol mixtures such as crude cresol, it being advisable to take the proportion of phenol and m-cresol into consideration. In such case, the entire reaction mixture, together with the components (p-cresol in particular) which do not enter into the reaction, can be used in the condensation treatment, resins soluble in benzine being nevertheless obtained. The substances (alcohols, haloids etc.) serving for the substitution of the p-hydrogen atom in the phenol may be used in an unrefined and mixed condition. The substituents may be purely aliphatic or hydroaromatic.

In the acid condensation of the formaldehyde with these p-substituted phenols, a certain analogous behaviour with that of their simplest representative, p-cresol, is displayed. Almost equimolecular amounts may be used without fear of producing an infusible resin; whereas phenol and m-cresol in particular must be used in somewhat considerable excess in order to prevent this risk.

In the case of alkaline contact agents, I have now found that the said p-substituted phenols behave in a very similar manner to p-cresol with regard to condensation with formaldehyde. They can be condensed at different temperatures in the presence of varying amounts of alkali, ammonia etc. with varying amounts of formaldehyde. According to the conditions, oily to solid masses, clear resins or infusible products are obtained. Equimolecular amounts of formaldehyde, or even up to 2 molecules can be taken up at lower temperatures. The method adopted in order to compound a proportion considerably exceeding the equimolecular one, consists in dissolving the phenol substance in alkalis and leave it in contact with aqueous formaldehyde at a moderate temperature for some time. Even considerably less than equimolecular proportions of alkali will suffice provided uniform solution of the components is effected. The reaction product is finally thrown down from the alkaline solution by means of any acid. The oily or resinous, and still fusible, products may be placed in moulds and transformed into very hard infusible and insoluble resins by the application of heat, preferably accompanied by pressure. The products prepared with more than an equimolecular proportion of formaldehyde become, under this treatment, harder and more elastic than those prepared with only equivalent amounts. Such an excess of formaldehyde is also very useful for the purposes described in the next paragraph. The transition into the infusible state proceeds more slowly than with the known products obtained from phenol and its low homologues. The resinous, still fusible products are just as soluble in benzine and oil as the resins prepared from the same components with acid agents.

Even the slower rate of resinification (i. e. of transition into the infusible state) and other differences in behaviour as compared with the known similar products of the heat hardening type, enlarge the sphere of possible application. Thus, for example, the transition into the insoluble form, when heated, can be entirely prevented by a whole series of substances, even when operating with already viscous products prepared with an excess of formaldehyde, provided such substances be present in not too small amount. Such substances comprise all possible artificial and natural, acid, neutral or neutralized resins, waxes, fatty oils, etc. Condensation products of the heat hardening type prepared from common phenols can only be reacted with acidic resins (for example, colophony), but yield with neutral resins, oils, etc. non-homogeneous, crumbly masses. It was up to now unknown to obtain useful combination products from heat hardening condensation products and such neutral stuffs.

I have now found that condensation products which belong to the heat hardening type and which are derived from those substituted phenols mentioned above can be brought into reaction also with these neutral stuffs. The latter undergo highly valuable modifications of their physical and chemical properties, such as melting point, hardness, viscosity, resistance to external influences etc. even when reacted only with relatively small amounts of the said condensation products. The viscosity of fatty oils is extensively increased. A very useful effect can be obtained with raw China-wood oil, for example, inasmuch as the reaction even with small amounts of the said products deprives it of its known undesirable drying character, and produces a clear, but very quick-drying film of great hardness and elasticity. It is, however, entirely new to work up neutralized, namely esterified colophony, or more or less neutral natural resins, with similar products in the specified manner. It should be noted that it is very important in preparing the condensation products that there should be present no unsubstituted phenol (hydroxy-benzol) or meta-cresol. Where even a very small quantity of unsubstituted phenol or meta-cresol is present, the condensation product obtained cannot be reacted with neutral resins and oils, owing to the formation of useless sago-like infusible and insoluble masses within the melted resin or oil employed.

Intermediate products suitable for reaction with waxes, fatty oils, etc., are those obtained from p-substituted phenols with a larger aliphatic radicle. These can also be worked up with melts of resin and fatty oils. The resins to be treated can also be dissolved in inert solvents. Moreover the incorporation of the condensation product can be effected at increased or diminished, instead of ordinary, pressure, or in presence of inert gases. Likewise, condensation products derived from p-benzyl phenols and an aldehyde, while not compatible with oils at ordinary temperatures are compatible with such oils at an elevated temperature of about 100° C. before the typical reaction with the oils sets in, which takes place at about 200° C.

The resins obtained by the acid method i. e. such as belong to the so-called "Novolak" type also can be melted with other artificial or natural, unaltered or more or less altered resins, such as coumarone resin, colophony, resin esters, resinates, fused copal, etc.

For the sake of completeness, it may be mentioned that the condensation of said p-substituted phenols can also be effected with neutral contact agents, or entirely without same; only the operation generally proceeds far more slowly. Formaldehyde may also be replaced by its polymers, hexamethylene-tetramine, methylene chloride, etc.; and acetaldehyde by paraldehyde.

*Example 1*

150 grms. of p-tertiarybutylphenol, prepared according to the Liebmann method (Ber. 14, p. 1842 and 15, p. 150), from isobutyl alcohol, phenol and zinc chloride, or in any other way, are heated to boiling with 95 grms. of 30% formaldehyde, in presence of 10 grms. of concentrated hydrochloric acid, for 8–10 hours under a reflux condenser. Finally, the aqueous liquid is separated from the condensation product (which is already almost solid at boiling temperature), and the latter is dehydrated by heating. A nearly water-white resin is obtained, of high melting point, very fast to light, and soluble in benzine and the like in any proportion.

Example 2

108 grms. of cresol American U. S. P., 80 grms. of cyclohexanol and 150 grms. of zinc chloride are heated at 180° for ¾ of an hour. Water is added after cooling, and the reaction product is separated from the aqueous solution of zinc chloride, being thereafter condensed (after having been distilled) with 40 grms. of paracetaldehyde with the aid of strong mineral acids. The water is finally eliminated and the resin is preferably freed from any uncondensed substances, in a current of steam. The resin is of high melting point, pale color and soluble in benzine.

Example 3

82 grms. of p-tertiary-amylphenol (prepared for example from equimolecular proportions of phenol and tertiary amyl chloride, with a little AlCl₃) are dissolved to a clear solution in 90 grms. of 30% formaldehyde and 75 cc. of 3n-NaOH, by gentle warming. The charge is maintained at 50–55° C. for about 24 hours, and the viscous oily reaction product is precipitated by any acid, separated from the supernatant aqueous liquid and dried in the water bath. When placed in moulds it can be transformed, under pressure (in autoclaves), into a very hard, infusible resin. Before and after this treatment it is extremely fast to light.

Example 4

75 grms. of p-tertiary-butylphenol are condensed for several hours at 100° C. with 50 grms. of 30% formaldehyde and 7.5 grms. of concentrated ammonia, until a clear, viscous resin has been formed, which can easily be separated from the aqueous liquid. It is of a pale lemon-yellow color, and is soluble in benzine and the like in all proportions. On being heated, it passes over into the infusible and insoluble form.

Example 5

20 grms. of the still moist product obtained as in Example 3 are gradually introduced into 100 grams of fused coumarone resin (soluble in benzine and with the melting point 50–55° C.), the temperature being finally raised to 200° C. The resulting resin which, if carefully prepared, is pale and soluble in benzine, melts at about 20° C. higher than the originating resin.

Example 6

100 grms. of purified Montan wax are treated in the same way as the above coumarone resin. The resulting wax has a considerably higher melting point, and is also much tougher and harder.

Example 7

100 grms. of China-wood oil are treated with 12 grms. of an alkali-condensed product of p-tertiary-butylphenol and formaldehyde, the temperature being finally raised to about 200° C. for a short time. The resulting product has the viscosity of thin stand oil and, when mixed with a suitable amount of drier, dries in about an hour (also in the warm) to a clear film of excellent properties.

Example 8

100 grms. of colophony-glycerol ester, with an acid value below 8 are melted with 25 grms. of a viscous oily condensation product obtained from p-benzylphenol and formaldehyde in the presence of alkali. The p-benzylphenol is prepared by the action of molecular quantities of phenol and benzyl chloride in presence of zinc chloride. The fusion of the condensation product with the colophony ester furnishes a perfectly clear resin, melting at about 40° C. higher than the ester, and being very satisfactorily soluble in benzine.

Example 9

100 grms. of dammar resin (M. P. 68/75° C. and acid value 24) are dissolved warm or melted in 20 grms. of mineral spirits, and a phenol-formaldehyde condensation product as in Examples 3, 7 and 8, is gradually added at over 100° C. If the operation be properly carried out, the pale color of the dammar resin will scarcely suffer and the product is equally fast to light and soluble, but at the same time has a higher melting point and is harder.

What I claim is:

1. A process for the production of benzine and oil soluble condensation products which comprises condensing an aldehyde with a phenol substituted in the para-position by a saturated hydrocarbon radicle containing four to six carbon atoms, in the absence of unsubstituted phenols.

2. A process as set forth in claim 1 wherein the condensation is carried out in the presence of a substance of acid reaction.

3. A process as set forth in claim 1 wherein the condensation is carried out in the presence of a substance of alkaline reaction.

4. A benzine and oil soluble condensation product derived from the reaction of an aldehyde with a phenol substituted in the para-position by a saturated hydrocarbon radicle containing four to six carbon atoms, in the absence of unsubstituted phenols.

5. A process for the production of benzine and oil soluble condensation products which comprises condensing together para-tertiary-butylphenol with formaldehyde.

6. A benzine and oil soluble condensation product derived from the reaction of para-tertiary-butylphenol with formaldehyde.

7. A process for the production of condensation products which comprises condensing para-tertiary-amylphenol with formaldehyde in the absence of unsubstituted phenols.

8. A benzine and oil soluble condensation product formed by condensing together para-tertiary-amylphenol and formaldehyde in the absence of unsubstituted phenols.

9. A process for the production of condensation products which comprises condensing a para tertiary-alkylphenol in which the akyl radicle contains four to five carbon atoms with formaldehyde in the presence of an alkali and in the absence of unsubstituted phenols.

10. A benzine and oil soluble condensation product formed by condensing a para-tertiary-alkylphenol, the alkyl containing four to five carbon atoms, and formaldehyde with the aid of an alkaline catalyst and in the absence of unsubstituted phenols.

11. A process for the production of condensation products which comprises condensing a para tertiary alkylphenol in which the alkyl radicle contains four to five carbon atoms with formaldehyde in the presence of ammonia and in the absence of unsubstituted phenols.

12. A process for the production of oil soluble condensation products wherein an aldehyde is condensed with a mixture consisting of a phenol substituted in the para position by a saturated hydrocarbon radicle containing four to six carbon atoms and of para-cresol in the absence of unsubstituted phenols.

13. A process for the production of oil soluble condensation products wherein an aldehyde is condensed with a mixture consisting of a phenol substituted in the para position by a tertiary hydrocarbon radicle containing four to five carbon atoms and of para-cresol in the absence of unsubstituted phenols.

14. An oil soluble condensation product derived from the reaction of formaldehyde with a mixture of para-cresol and a phenol substituted in the para-position by a saturated hydrocarbon radicle having four to six carbonatoms, said product being capable of undergoing a further substantial condensation on the application of heat, and of forming a uniform homogeneous product when reacted with a substantial excess of fatty oils, waxes, substantially neutral resins, or mixtures thereof.

15. A process for producing a soluble condensation product capable of undergoing further substantial condensation on the application of heat and of forming uniform homogeneous products when reacted with an excess of substantially neutral resins, drying oils or mixtures thereof, which process comprises reacting (1) a phenol substituted in the para-position by a hydrocarbon radical having four to seven carbon atoms, in the absence of unsubstituted phenol and (2) a substantial excess of formaldehyde over the equimolecular proportion, the reaction being carried out with the aid of a strong alkaline catalyst.

16. A condensation product derived from (1) a phenol substituted in the para-position by a hydrocarbon radical having four to seven carbon atoms in the absence of unsubstituted phenol and (2) a substantial excess of formaldehyde over the equimolecular proportion, said condensation product being capable of undergoing further substantial condensation on application of heat, and of forming uniform homogeneous products when reacted with a multiple proportion of substantially neutral resins, of drying oils or mixtures thereof, which products are distinguished by their substantially higher viscosity as compared with the neutral resins and drying oils themselves.

17. A process for the production of benzine and oil soluble condensation products which comprises condensing a phenol substituted in the para-position by a saturated hydrocarbon radicle containing four to six carbon atoms in the absence of unsubstituted phenol with an excess of formaldehyde over the equimolecular proportion in the presence of a substance of alkaline reaction, said condensation product being capable of undergoing further substantial condensation when heated.

18. A process for the production of benzine and oil soluble condensation products capable of undergoing further substantial condensation when heated, comprising the steps of forming a uniform solution from (1) a phenol substituted in the para-position by a saturated hydrocarbon radicle having four to six carbon atoms in the absence of unsubstituted phenol and (2) a substantial excess of formaldehyde over the equimolecular proportion with the aid of a strong alkaline catalyst; leaving the solution for a prolonged period until the two components have been chemically compounded, and then precipitating out the condensation product by neutralizing the reaction mixture.

19. An oil soluble condensation product obtained by condensing (1) a phenol substituted in the para-position by a hydrocarbon radicle having 4 to 7 carbon atoms, in the absence of unsubstituted phenol, and (2) a substantial excess of formaldehyde over the equimolecular quantity with the aid of an alkaline catalyst, said product being capable of undergoing further substantial condensation by the application of heat and of forming a uniform homogeneous product when reacted with a substantial excess of fatty oils, substantially neutral resins, waxes or mixtures thereof.

20. An oil soluble condensation product as set forth in claim 19, wherein the phenol employed in its production is substituted in the para-position by a saturated hydrocarbon radicle containing four to six carbon atoms.

21. An oil soluble condensation product as set forth in claim 19, wherein the phenol employed in its production is substituted in the para-position by a tertiary radicle containing four to five carbon atoms.

22. An oil soluble condensation product as set forth in claim 19, wherein the substituted phenol employed in its production is para-tertiary-butyl-phenol.

23. An oil soluble condensation product as set forth in claim 19, wherein the substituted phenol employed in its production is para-tertiary amyl phenol.

24. A process for the production of a condensation product from p-benzylphenol capable of undergoing further substantial condensation when heated, comprising the steps of forming a uniform solution from p-benzylphenol and a substantial excess of formaldehyde over the equimolecular proportion with the aid of a strong alkaline catalyst and in the absence of unsubstituted phenol; leaving the solution for a prolonged period until the two components have been chemically compounded, and then precipitating out the condensation product by neutralizing the reaction mixture.

25. A condensation product derived from p-benzylphenol in the absence of unsubstituted phenol, and a substantial excess of formaldehyde over the equimolecular proportion, said product being capable of undergoing a further substantial condensation on the application of heat, and of forming a uniform homogeneous product, when reacted with a substantial excess of fatty oils, substantially neutral resins, or mixtures thereof.

HERBERT HÖNEL

DISCLAIMER 1,996,069.—*Herbert Hönel*, Vienna, Austria. PROCESS FOR THE PRODUCTION OF CONDENSATION PRODUCTS. Patent dated April 2, 1935. Disclaimer filed May 12, 1937, by the assignee, *Beck, Koller & Company, Inc.*

Hereby disclaims from claims 16 and 19 of said patent any condensation product derived from a purely aryl substituted phenol and formaldehyde, by the aid of an acid or weakly alkaline catalyst, and from claim 15 any process for producing a condensation product, derived from a purely aryl substituted phenol and formaldehyde, by the aid of an acid or weakly alkaline catalyst.

[*Official Gazette June 15, 1937.*]

DISCLAIMER 1,996,069.—*Herbert Hönel*, Vienna, Austria. PROCESS FOR THE PRODUCTION OF CONDENSATION PRODUCTS. Patent dated April 2, 1935. Disclaimer filed July 28, 1937, by the assignee, *Beck, Koller & Company, Inc.*

Hereby disclaims from claims 16 and 19 of said patent any condensation product derived from an aryl substituted phenol and formaldehyde, and from claim 15 any process for producing a condensation product derived from an aryl substituted phenol and formaldehyde.

[*Official Gazette August 31, 1937.*]